United States Patent
Foti

(10) Patent No.: US 11,805,154 B2
(45) Date of Patent: Oct. 31, 2023

(54) IMS SERVICE LEASING

(71) Applicant: Telefonaktiebolaget LM Ericsson (publ), Stockholm (SE)

(72) Inventor: George Foti, Dollard des Ormeaux (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/288,625

(22) PCT Filed: Oct. 15, 2019

(86) PCT No.: PCT/IB2019/058785
§ 371 (c)(1),
(2) Date: Apr. 26, 2021

(87) PCT Pub. No.: WO2020/084392
PCT Pub. Date: Apr. 30, 2020

(65) Prior Publication Data
US 2022/0021712 A1 Jan. 20, 2022

Related U.S. Application Data

(60) Provisional application No. 62/751,276, filed on Oct. 26, 2018.

(51) Int. Cl.
*H04L 65/1016* (2022.01)
*H04L 65/1066* (2022.01)
(Continued)

(52) U.S. Cl.
CPC ...... *H04L 65/1016* (2013.01); *H04L 65/1066* (2013.01); *H04L 65/1104* (2022.05); *H04L 65/403* (2013.01)

(58) Field of Classification Search
CPC ............. H04L 65/1016; H04L 65/1066; H04L 65/1104; H04L 65/403; H04L 65/1063; H04L 65/1036; H04L 65/70
See application file for complete search history.

(56) References Cited

U.S. PATENT DOCUMENTS 8,316,457 B1 * 11/2012 Paczkowski ........ H04L 65/1046
726/28
2007/0008913 A1 1/2007 Naqvi et al.
(Continued)

FOREIGN PATENT DOCUMENTS

| WO | 2019120076 A1 | 6/2019 |
| WO | 2019150245 A1 | 8/2019 |

OTHER PUBLICATIONS

3GPP TR 23.794 V0.4.0 "3rd Generating Partnership Project: Technical Specification Group Services and System Aspects; Study on Enhanced IMS to 5GC Integration (Release 16)" , Jun. 2018 (Year: 2018).*

(Continued)

*Primary Examiner* — Caroline H Jahnige
(74) *Attorney, Agent, or Firm* — SAGE PATENT GROUP

(57) ABSTRACT

Embodiments of a method performed by an Interconnect Border Control Function (IBCF) in an Internet Protocol (IP) Multimedia Subsystem (IMS) network and corresponding embodiments of an IBCF are disclosed. In some embodiments, the method performed by the IBCF comprises receiving, from an IMS node in a virtual IMS network domain of a virtual IMS network operator, a Session Initiation Protocol (SIP) message that serves as a request for a leased IMS service. The SIP message comprises information that identifies the leased IMS service, information that identifies an IMS network slice, information that identifies the virtual IMS network operator, information that identifies one or more sub-services requested for the leased IMS service, (Continued)

and/or information that identifies an IMS network slice instance. The method further comprises making a decision as to whether to accept or reject the request based on the information comprised in the SIP message.

20 Claims, 11 Drawing Sheets

(51) Int. Cl.
   *H04L 65/403* (2022.01)
   *H04L 65/1104* (2022.01)

(56) References Cited

U.S. PATENT DOCUMENTS

| | | |
|---|---|---|
| 2007/0088836 A1* | 4/2007 | Tai .................. H04L 65/401 709/227 |
| 2009/0093249 A1 | 4/2009 | Zhu et al. |
| 2010/0150137 A1 | 6/2010 | Lu et al. |
| 2010/0217875 A1 | 8/2010 | Vergara et al. |
| 2012/0195235 A1* | 8/2012 | Balla .................. H04L 65/1095 370/259 |
| 2013/0250942 A1* | 9/2013 | Khan .................. H04L 65/1073 370/352 |
| 2015/0195864 A1 | 7/2015 | Rodrigo et al. |
| 2016/0248814 A1* | 8/2016 | Mufti .................. H04L 69/24 |
| 2018/0007612 A1 | 1/2018 | Jahangir et al. |
| 2019/0021043 A1 | 1/2019 | Youn et al. |
| 2019/0223093 A1 | 7/2019 | Watfa et al. |
| 2019/0288988 A1 | 9/2019 | Noldus |
| 2020/0137675 A1 | 4/2020 | Park et al. |
| 2020/0169951 A1* | 5/2020 | Cai .................. H04W 4/24 |
| 2021/0021647 A1* | 1/2021 | Cai .................. H04L 65/1036 |

OTHER PUBLICATIONS

Non-Final Office Action for U.S. Appl. No. 16/965,712, dated Sep. 2, 2021, 16 pages.

Huawei, et al., "S2-182176: Solution for Network Slicing and IMS Scenario 2," 3GPP SA WG2 Meeting #126, Feb. 26-Mar. 2, 2018, Montreal, Canada, 4 pages.

Author Unknown, "Technical Specification Group Core Network and Terminals; IP Multimedia (IM) session handling; IM call model; Stage 2 (Release 15)," Technical Specification 23.218, Version 15.0.0, Jun. 2018, 3GPP Organizational Partners, 73 pages.

International Search Report and Written Opinion for International Patent Application No. PCT/IB2019/058785, dated Jan. 3, 2020, 17 pages.

Author Unknown, "Technical Specification Group Services and System Aspects; IP Multimedia Subsystem (IMS); Stage 2 (Release 15)," Technical Specification 23.228, Version 15.1.0, 3GPP Organizational Partners, Dec. 2017, 329 pages.

Author Unknown, "Technical Specification Group Services and System Aspects; System Architecture for the 5G System; Stage 2 (Release 15)," Technical Specification 23.501, Version 15.0.0, 3GPP Organizational Partners, Dec. 2017, 181 pages.

Author Unknown, "Technical Specification Group Services and System Aspects; Procedures for the 5G System; Stage 2 (Release 15)," Technical Specification 23.502, Version 15.0.0, 3GPP Organizational Partners, Dec. 2017, 258 pages.

Author Unknown, "Technical Specification Group Services and System Aspects; Study on Enhanced IMS to 5GC Integration (Release 16)," Technical Report 23.794, Version 1.0.0, Mar. 2019, 3GPP Organizational Partners, 83 pages.

Author Unknown, "Technical Specification Group Core Network and Terminals; Study on IMS Restoration Procedures (Release 9)," Technical Report 23.820, Version 9.0.0, Sep. 2009, 3GPP Organizational Partners, 43 pages.

Author Unknown, "Technical Specification Group Core Network and Terminals; IP Multimedia call control protocol based on Session Initiation Protocol (SIP) and Session Description Protocol (SDP); Stage 3 (Release 15)," Technical Specification 24.229, Version 15.1.0, 3GPP Organizational Partners, Dec. 2017, 999 pages.

China Mobile, "S1-174518: FS_enIMS TR22.823: Use case on network slicing of IMS independent to 5GC slice," Third Generation Partnership Project (3GPP), TSG-SA WG1 Meeting #80, Nov. 27-Dec. 1, 2017, 3 pages, Reno, NV.

China Mobile, "S2-180714: key issue of P-CSCF discovery for UE accessing to multiple IMS network via a network slice," Third Generation Partnership Project (3GPP), Sa WG2 Meeting #125, Jan. 22-26, 2018, 1 page, Gothenburg, Sweden.

China Mobile, "S5-197283: Add attribute properties for network slice supports IMS and SSC mode," Third Generation Partnership Project (3GPP), TSG-SA5 Meeting #128, Nov. 18-22, 2019, Zhuhai, China, 6 pages.

T-Mobile USA Inc, "S2-172029: Network Slicing and IMS Interactions," Third Generation Partnership Project (3GPP), SA WG2 Meeting #120, Mar. 27-31, 2017, 3 pages, Busan, South Korea.

International Search Report and Written Opinion for International Patent Application No. PCT/IB2019/050682, dated Apr. 12, 2019, 16 pages.

Invitation to Pay Fees and Partial Search for International Patent Application No. PCT/IB2020/058054, dated Nov. 20, 2020, 22 pages.

International Search Report and Written Opinion for International Patent Application No. PCT/IB2020/058054, dated Jan. 18, 2021, 26 pages.

\* cited by examiner

IMS SERVICE LEASING

RELATED APPLICATIONS

This application is a 35 U.S.C. § 371 national phase filing of International Application No. PCT/IB2019/058785, filed Oct. 15, 2019, which claims the benefit of provisional patent application Ser. No. 62/751,276, filed Oct. 26, 2018, the disclosures of which are hereby incorporated herein by reference in their entireties.

TECHNICAL FIELD

The present disclosure relates to an Internet Protocol (IP) Multimedia Subsystem (IMS) and, in particular, IMS services as they relate to Mobile Virtual Network Operators (MVNOs).

BACKGROUND

The Internet Protocol (IP) Multimedia Subsystem (IMS) is used to provide many types of services in relation to a cellular communications system. There is a need for IMS service solutions that provide flexibility to network operators.

SUMMARY

Systems and methods are disclosed herein that enable Internet Protocol (IP) Multimedia Subsystem (IMS) service leasing. Embodiments of a method performed by an Interconnect Border Control Function (IBCF) in an IMS network and corresponding embodiments of an IBCF are disclosed. In some embodiments, a method performed by an IBCF in an IMS network of an IMS service provider to provide IMS services to a virtual IMS network operator comprises receiving, from an IMS node in a virtual IMS network domain of a virtual IMS network operator, a Session Initiation Protocol (SIP) message that serves as a request for a leased IMS service. The SIP message comprises information that identifies the leased IMS service, information that identifies an IMS network slice, information that identifies the virtual IMS network operator, information that identifies one or more sub-services requested for the leased IMS service, information that identifies an IMS network slice instance, or any combination thereof. The method further comprises making a decision as to whether to accept the request for the leased IMS service or reject the request for the leased IMS service based on the information comprised in the SIP message.

In some embodiments, the SIP message comprises information that identifies an IMS network slice, where the IMS network slice is associated with the leased IMS service. In some other embodiments, the SIP message comprises information that identifies an IMS network slice instance, where the IMS network slice instance is an instance of an IMS network slice associated with the leased IMS service.

In some embodiments, the decision is to accept the request for the leased IMS service, and the method further comprises, upon making the decision to accept the request for the leased IMS service, initiating the requested IMS service using one or more IMS nodes in the IMS network. In some embodiments, the method further comprises creating one or more charging data records that reflect that the requested leased IMS service was provided for the virtual IMS network operator.

In some embodiments, the decision is to reject the request for the leased IMS service, and the method further comprises, upon making the decision to reject the request for the leased IMS service, sending a message to the IMS node in the virtual IMS operator domain that indicates that the request for the requested leased IMS service is rejected.

In some embodiments, making the decision as to whether to accept the request for the leased IMS service or reject the request for the leased IMS service comprises authenticating that the request belongs to the virtual IMS network operator, ensuring that the virtual IMS network operator is entitled for the leased IMS service, validating the IMS network slice and the leased IMS service (e.g., validating that the leased IMS service is one that is leased by the virtual IMS network operator), validating that a Session Description Protocol (SDP) matches the requested IMS service, or any combination thereof.

In some embodiments, the method further comprises providing at least a portion of the information comprised the SIP message to another IMS node in the IMS network of the IMS service provider.

In some embodiments, the leased IMS service is a media related function. In some other embodiments, the leased IMS service is transcoding. In some other embodiments, the leased IMS service is an IMS service related to a conference call.

In some embodiments, an IBCF for an IMS network for providing IMS services to a virtual IMS network operator is adapted to receive, from an IMS node in a virtual IMS network domain of a virtual IMS network operator, a SIP message that serves as a request for a leased IMS service. The SIP message comprises information that identifies the leased IMS service, information that identifies an IMS network slice, information that identifies the virtual IMS network operator, information that identifies one or more sub-services requested for the leased IMS service, information that identifies an IMS network slice instance, or any combination thereof. The IBCF is further adapted to make a decision as to whether to accept the request for the leased IMS service or reject the request for the leased IMS service based on the information comprised in the SIP message.

In some embodiments, a physical IMS infrastructure node that implements an IBCF for an IMS network for providing leased IMS services to a virtual IMS network operator comprises an interface and processing circuitry associated with the interface. The processing circuitry is configured to cause the physical IMS infrastructure node to implement the IBCF such that the IBCF operates to receive, from an IMS node in a virtual IMS network domain of a virtual IMS network operator, a SIP message that serves as a request for a leased IMS service. The SIP message comprises information that identifies the leased IMS service, information that identifies an IMS network slice, information that identifies the virtual IMS network operator, information that identifies one or more sub-services requested for the leased IMS service, information that identifies an IMS network slice instance, or any combination thereof. The processing circuitry is further configured to cause the physical IMS infrastructure node to implement the IBCF such that the IBCF further operates to make a decision as to whether to accept the request for the leased IMS service or reject the request for the leased IMS service based on the information comprised in the SIP message.

Embodiments of a method performed by an IMS node in a virtual IMS network domain of a virtual IMS network operator to request a leased IMS service from an IMS network and corresponding embodiments of the IMS node are also disclosed. In some embodiments, a method performed by an IMS node in a virtual IMS network domain of a virtual IMS network operator to request a leased IMS service from an IMS network comprises sending, to an IBCF in the IMS network, a SIP message that serves as a request for a leased IMS service. The SIP message comprises information that identifies the leased IMS service, information that identifies an IMS network slice, information that identifies the virtual IMS network operator, information that identifies one or more sub-services requested for the leased IMS service, information that identifies an IMS network slice instance, or any combination thereof.

In some embodiments, the leased IMS service is a media related function. In some other embodiments, the leased IMS service is transcoding. In some other embodiments, the leased IMS service is an IMS service related to a conference call.

In some embodiments, an IMS node in a virtual IMS network domain of a virtual IMS network operator for requesting a leased IMS service from an IMS network is adapted to send, to an IBCF in the IMS network, a SIP message that serves as a request for a leased IMS service. The SIP message comprises information that identifies the leased IMS service, information that identifies an IMS network slice, information that identifies the virtual IMS network operator, information that identifies one or more sub-services requested for the leased IMS service, information that identifies an IMS network slice instance, or any combination thereof.

In some embodiments, a physical IMS infrastructure node that implements an IMS node in a virtual IMS network domain of a virtual IMS network operator for requesting a leased IMS service from an IMS network comprises an interface and processing circuitry associated with the interface. The processing circuitry is configured to cause the physical IMS infrastructure node to implement the IMS node such that the IMS node operates to send, to an IBCF in the IMS network, a SIP message that serves as a request for a leased IMS service. The SIP message comprises information that identifies the leased IMS service, information that identifies an IMS network slice, information that identifies the virtual IMS network operator, information that identifies one or more sub-services requested for the leased IMS service, information that identifies an IMS network slice instance, or any combination thereof.

Embodiments of a method performed by an Application Server (AS) in an IMS network of an IMS service provider to provide leased IMS services to a virtual network operator and corresponding embodiments of an AS are also disclosed. In some embodiments, a method performed by an AS in an IMS network of an IMS service provider to provide leased IMS services to a virtual network operator comprises receiving, from a virtual network operator domain of the virtual network operator, a SIP message. The method further comprises, upon receiving the SIP message, determining that a leased IMS service is needed to process the SIP message and initiating the leased IMS service in the IMS network of the IMS service provider by sending a second SIP message to another node in the IMS network of the IMS service provider. The second SIP message comprises information that identifies the leased IMS service, information that identifies an IMS network slice, information that identifies the virtual network operator, information that identifies one or more sub-services desired for the leased IMS service, information that identifies an IMS network slice instance, or any combination thereof.

In some embodiments, one or more charging data records are created that reflect that the leased IMS service was provided for the virtual network operator.

In some embodiments, the leased IMS service is a media related function. In some other embodiments, the leased IMS service is transcoding. In some other embodiments, the leased IMS service is an IMS service related to a conference call.

In some embodiments, an AS in an IMS network of an IMS service provider is adapted to receive, from a virtual network operator domain of the virtual network operator, a SIP message. The AS is further adapted to, upon receiving the SIP message, determine that a leased IMS service is needed to process the SIP message and initiate the leased IMS service in the IMS network of the IMS service provider by sending a second SIP message to another node in the IMS network of the IMS service provider. The second SIP message comprises information that identifies the leased IMS service, information that identifies an IMS network slice, information that identifies the virtual network operator, information that identifies one or more sub-services desired for the leased IMS service, information that identifies an IMS network slice instance, or any combination thereof.

In some embodiments, a physical IMS infrastructure node that implements an AS in an IMS network of an IMS service provider comprises an interface and processing circuitry associated with the interface. The processing circuitry is configured to cause the physical IMS infrastructure node to implement the AS such that the AS operates to receive a SIP message from a virtual network operator domain of the virtual network operator and, upon receiving the SIP message, determine that a leased IMS service is needed to process the SIP message and initiate the leased IMS service in the IMS network of the IMS service provider by sending a second SIP message to another node in the IMS network of the IMS service provider. The second SIP message comprises information that identifies the leased IMS service, information that identifies an IMS network slice, information that identifies the virtual network operator, information that identifies one or more sub-services desired for the leased IMS service, information that identifies an IMS network slice instance, or any combination thereof.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
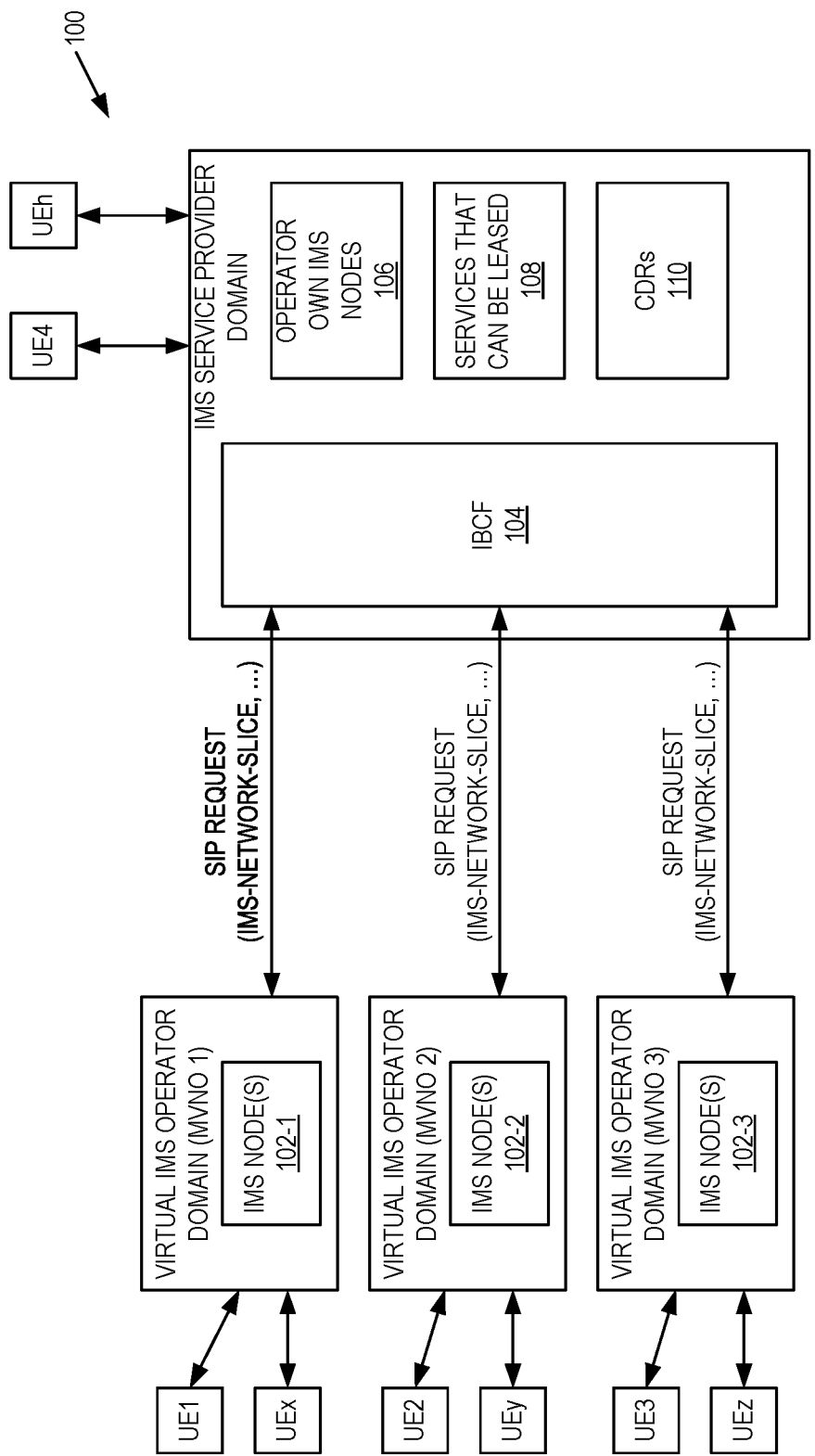
FIG. 1 illustrates a system in which interaction between an Internet Protocol (IP) Multimedia Subsystem (IMS) node(s) owned by Mobile Virtual Network Operators (MVNOs) and an IMS node(s) owned by an IMS service provider is provided in accordance with some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Mobile Virtual Network Operators (MVNOs) offer Voice over Long Term Evolution (VoLTE) and messaging services over Internet Protocol (IP) Multimedia Subsystem (IMS). There are different types of MVNOs. In particular, some MVNOs own only IMS nodes and use the Radio Access Network (RAN) and core network of another network operator(s). Other MVNOs own everything except the RAN. Other types of MVNOs are between these two extremes.

There currently exist certain challenge(s). Today, the MVNO is either fully integrated with some other IMS operator or the MVNO wants to own the equipment for the services that the MVNO wants to support.

Internet Protocol (IP) Multimedia Subsystem (IMS) network slicing offers the advantage of a new business model for Mobile Virtual Network Operators (MVNOs) and network operators. Using IMS network slicing, an MVNO can own the IMS control nodes only, and lease other IMS services from any other IMS operator who can offer these services. These IMS services can span specific Application Servers (ASs), media resources such as conferencing equipment or announcement, transcoding equipment, etc. IMS network slicing enables leasing of such IMS services. It is also possible with IMS network slicing to lease some services while owning other services. So, for example, one MVNO may own its own Multimedia Telephony (MMTEL) AS (MTAS), while leasing only conferencing equipment, while another may lease everything including the MTAS.

The present disclosure provides solutions in which IMS network slicing enables leasing of IMS services. The present disclosure proposes an example architecture along with examples that show how this architecture can work to enable leasing of IMS services.

As discussed in the Background, today, the MVNO is either fully integrated with some other IMS operator or the MVNO wants to own the equipment for the services that the MVNO wants to support. Certain aspects of the present disclosure and their embodiments may provide solutions to the aforementioned or other challenges. Embodiments disclosed herein provide a framework for interaction between MVNOs and IMS service providers from whom they are leasing services. In some embodiments, the interaction between a node (e.g., an IMS node) owned by the MVNO (which is referred to herein as a node in the MVNO domain or in the "virtual IMS operator domain") and the IMS service provider goes through a secure Interconnect Border Control Function (IBCF). In some embodiments, this interaction includes a Session Initiation Protocol (SIP) message (e.g., a SIP request) that is sent from the node in the MVNO domain to the IBCF in the IMS service provider domain, where the SIP message includes information that identifies an IMS network slice (e.g., an IMS network slice associated with the requested IMS service). The IBCF performs one or more checks to decide whether to accept the request or reject the request, as will be described below in detail. If the check(s) is(are) successful, the requested service is provided and, in some embodiments, a Charging Data Record(s) (CDR(s)) is created to capture the information needed for offline charging settlement.

Certain embodiments may provide one or more of the following technical advantage(s). Embodiments disclosed herein propose using IMS network slicing to enable new business models, leading to higher competition and a more competitive marketplace.

It should be noted that while IMS network slicing is used to identify leased IMS services in many of the embodiments described herein, IMS network slicing is only an example. For instance, when using IMS network slicing, different IMS network slices may be associated with different leased IMS services. However, embodiments disclosed herein are not limited to using IMS network slicing to identify leased IMS services. Rather, any type of information can be used to identify leased IMS services and, e.g., included in appropriate messages (e.g., SIP messages) provided from the MVNO to the IMS network of the IMS service provider and/or within the IMS network of the IMS service provider.

In this regard, FIG. 1 illustrates a system 100 in which interaction between an IMS node(s) owned by MVNOs and an IMS node(s) owned by an IMS service provider is provided in accordance with some embodiments of the present disclosure. In this example, there are three MVNOs, but there may be any number of one or more MVNOs. Each MVNO owns respective IMS node(s) 102. These IMS node(s) 102 may be IMS control nodes such as, e.g., a Proxy Call Session Control Function(s) (P-CSCF(s)) and Serving Call Session Control Function(s) (S-CSCF(s)) and/or other IMS nodes such as, e.g., a Home Subscriber Server (HSS) and/or a MTAS. Specifically, in this example, a first MVNO (MVNO 1) owns one or more IMS nodes 102-1. The IMS nodes 102-1 are referred to herein as being in a "domain" of MVNO 1. Since we are dealing with the IMS, MVNO 1 is also referred to herein as a virtual IMS operator, and the domain of MVNO 1 is also referred to herein as a virtual IMS operator domain. Note that, as used herein, an MVNO "domain" or virtual IMS operator "domain" is a term used to indicate that the respective nodes (e.g., IMS node(s) 102 that are in the "domain") are owned by the respective MVNO or virtual IMS operator. Likewise, in this example, a second MVNO (MVNO 2) owns one or more IMS nodes 102-2. Again, the IMS nodes 102-2 are referred to herein as being in a "domain" of MVNO 2. Since we are dealing with the IMS, MVNO 2 is also referred to herein as a virtual IMS operator, and the domain of MVNO 2 is also referred to herein as a virtual IMS operator domain. Also in this example, a third MVNO (MVNO 3) owns one or more IMS nodes 102-3. Again, the IMS nodes 102-3 are referred to herein as being in a "domain" of MVNO 3. Since we are dealing with the IMS, MVNO 3 is also referred to herein as a virtual IMS operator, and the domain of MVNO 3 is also referred to herein as a virtual IMS operator domain.

The MVNOs (MVNO 1, MVNO 2, and MVNO 3) have agreements with an IMS service provider by which they lease (or otherwise have access to) IMS service(s) provided by IMS nodes owned by the IMS service provider. This leasing is preferably pay-per-use. The IMS service provider may be a wholesale IMS service provider and may provide IMS services such as, e.g., specific ASs, media resources (e.g., conferencing equipment, announcement equipment), transcoding equipment, etc. The IMS nodes owned by the IMS service provider are referred to herein as being in an IMS service provider domain. In this example, the IMS service provider owns an IMS network, which is referred to herein as being an IMS network of the IMS service provider or equivalently an IMS network in the IMS service provider domain. As illustrated, the IMS nodes in the IMS service provider domain include an IBCF 104 that serves as an interface between the IMS nodes 102 in the virtual IMS operator domains and the IMS network in the IMS service provider domain. The IMS service provider domain also includes one or more additional IMS nodes 106 that provide IMS services. These IMS services include IMS services 108 that can be leased by virtual IMS operators. In addition, CDRs 110 are also created and stored in the IMS service provider domain, e.g., in order to bill the virtual IMS operators for IMS services, e.g., on a per IMS service basis, based on the amount of IMS services provided, based on the types of IMS services provided, and/or the like. Importantly, different IMS leased services are associated with different IMS network slices. For example, each IMS service that can be leased can be associated with a different IMS network slice. As another example, different sets of IMS leased services can be associated with different IMS network slices. In other words, there are preferably multiple IMS network slices in the IMS service provider domain, where each IMS network slice is used to provide one or more IMS leased services. Note that the IMS service that is offered to the end user should be distinguished from the leased IMS service offered to the virtual IMS network operator as an integral part of the overall end user service.

In this example, User Equipments (UEs) UE1 and UEx access IMS services via MVNO 1, UE2 and UEy access IMS services via MVNO 2, and UE3 and UEz access IMS services via MVNO 3. While not illustrated in FIG. 1, the UEs access the IMS nodes (e.g., the IMS nodes 102) via Radio Access Network(s) (RAN(s)) and core network(s) that are, e.g., owned by the respective MVNOs or are accessible to the respective MNVOs via, e.g., agreements with the owner(s) of the RAN(s) and core network(s). Further, in this example, UE4 and UEh access IMS services via the IMS network of the IMS service provider.

Figure 2:
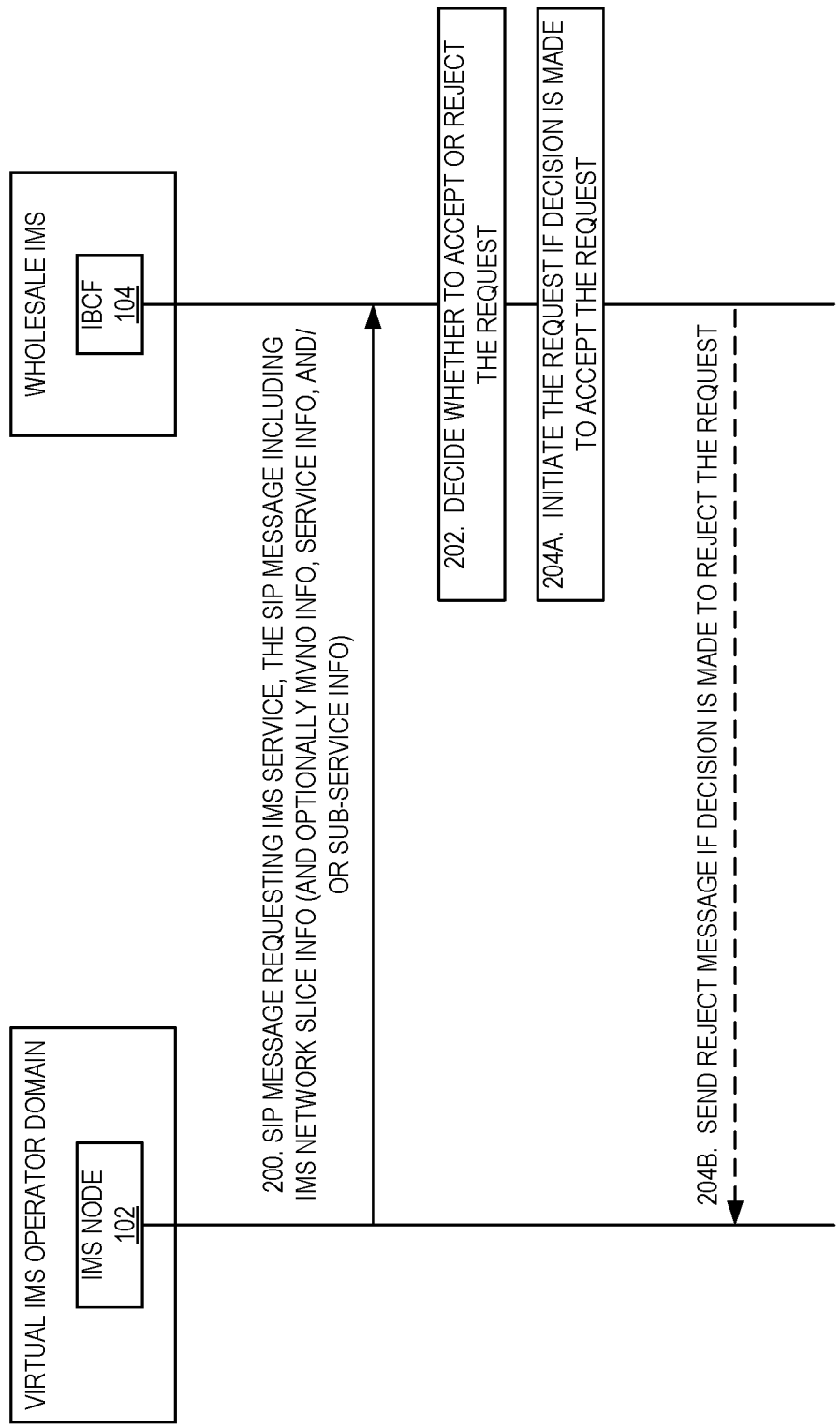
FIG. 2 illustrates the operation of an IMS node in a virtual IMS operator domain and an Interconnect Border Control Function (IBCF) in the IMS service provider domain in accordance with some embodiments of the present disclosure.

FIG. 2 illustrates the operation of an IMS node 102 in one of the virtual IMS operator domains and the IBCF 104 in the IMS service provider domain in accordance with some embodiments of the present disclosure. As illustrated, an IMS node 102 in a particular virtual IMS operator domain (e.g., in the domain of a particular MVNO) sends a SIP message to the IBCF 104 (step 200). The SIP message is also referred to herein as a SIP request such as, e.g., a SIP Session Initiation Request. The SIP message operates as a request for a desired IMS service(s). The SIP message includes:
  information that identifies an IMS network slice (e.g., an IMS network slice associated with the requested IMS service); and/or
  information that identifies the virtual IMS network operator; and/or
  information that identifies the requested leased IMS service; and/or
  information that identifies one or more sub-services requested for the requested leased IMS service (e.g., an enumerated list for sub-services if applicable (e.g., specific language for announcement, multi-language for conferencing, etc.), where this list can be per service (e.g., conferencing has its own list, MMTEL has its own list, etc.)); and/or
  information that identifies an IMS network slice instance (e.g., an instance of an IMS network slice associated with the requested IMS service).

The requested leased IMS service may be any IMS service that is, e.g., leased by the IMS service provider. For example, the requested leased IMS service may be a media related function (e.g., playing an announcement). As another example, the requested leased IMS service may be transcoding. As another example, the requested leased IMS service may be an IMS service related to a conference call.

The IBCF 104 makes a decision as to whether to accept the request for the leased IMS service or reject the request for the leased IMS service based on the information comprised in the SIP message (step 202). In some embodiments, the IBCF 104 makes this decision by performing one or more checks. These check(s) include:
  authenticating that the request belongs to the virtual IMS network operator; and/or
  ensuring that the virtual IMS network operator is entitled for the requested leased IMS service (i.e., ensuring that the virtual IMS network operator is a subscriber to the requested leased IMS service); and/or
  validating the IMS network slice and the requested leased IMS service (e.g., assuming that there are different IMS network slices for different IMS services that can be leased, validating that the requested leased IMS service matches the IMS network slice indicated in the request); and/or
  validating that a Session Description Protocol (SDP) (which is included in the SIP initiation request) matches the requested IMS service.

The IBCF 104 decides to accept the request if the check(s) is successful (e.g., if the requested is successfully authenticated). Otherwise, the IBCF 104 decides to reject the request. If the IBCF 104 decides to accept the request, the IBCF 104 initiates the requested leased IMS service using one or more of the IMS nodes 106 in the IMS service provider domain (step 204A). Conversely, if the IBCF 104 decides to reject the request, the IBCF 104 optionally sends a reject message to the IMS node 102 (step 204B).

Again, while the example of FIG. 2 uses IMS network slice(s) to identify the requested IMS service(s), as discussed above, the present disclosure is not limited thereto. In some other embodiments, the SIP message in step 200 may include information, other than IMS network slice information, that identifies the requested leased IMS service(s). This information may include, for example, a predefined identifier associated with the requested leased IMS service(s).

Figure 3A:
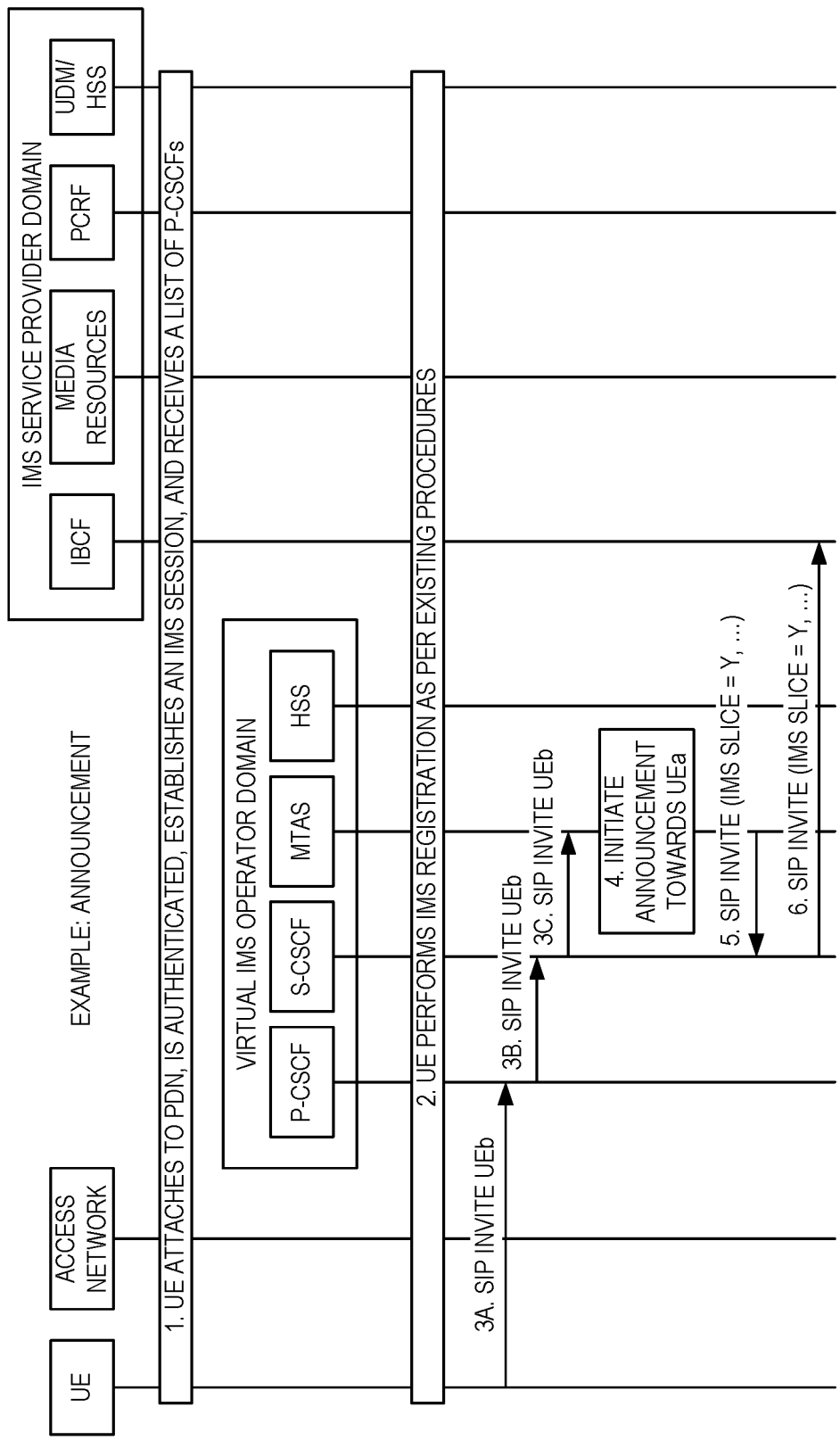
FIGS. 3A and 3B illustrate a specific example in which an MVNO owns its Multimedia Telephony (MMTEL) Application Server (AS) (MTAS) but leases media announcement services from the IMS service provider (e.g., another IMS operator) in accordance with an example embodiment of the present disclosure.
Figure 3B:
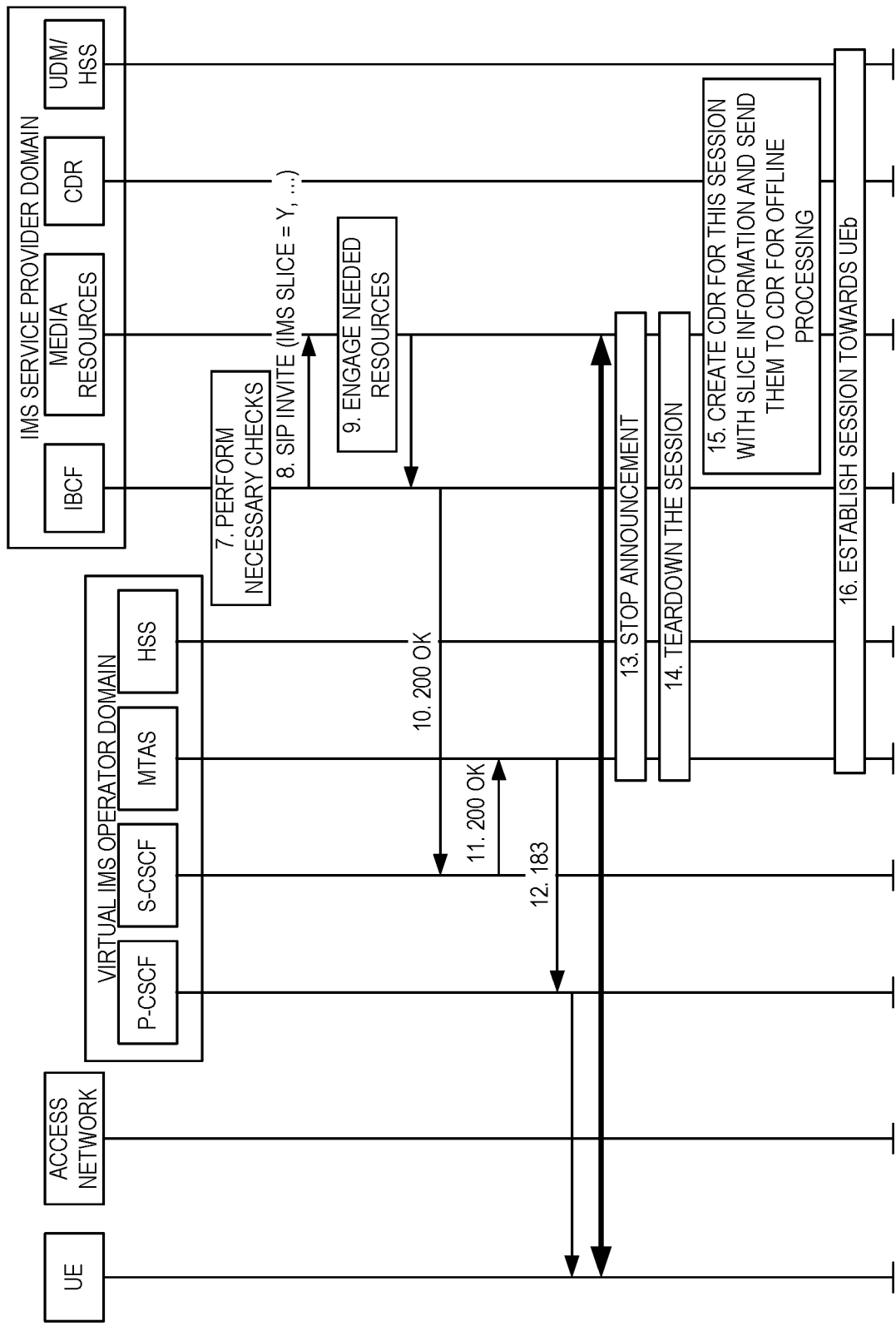

FIGS. 3A and 3B illustrate a specific example in which an MVNO owns its MTAS but leases media announcement services from the IMS service provider (e.g., another IMS operator). The steps in FIGS. 3A and 3B are:

Step 1: In step 1, a UE attaches to an access network and establishes a Packet Data Network (PDN) connection to the IMS, e.g., in the conventional manner.

Step 2: In step 2, the UE establishes an IMS registration, e.g., in the conventional manner based on existing procedures. In this example, the MVNO includes its own HSS. In other words, the IMS node(s) 102 of this particular MVNO includes an HSS. In addition, as illustrated in FIGS. 3A and 3B, the IMS node(s) 102 of this particular MVNO includes a P-CSCF, an S-CSCF, and an MTAS.

Steps 3A-3C: In steps 3A-3B, the UE (now referred to as UEa) initiates a session towards another UE, referred to as UEb. The session arrives at the MTAS in step 3C.

Step 4: In step 4, the MTAS decides to initiate an announcement to UEa before delivering the session to UEb.

Steps 5-6: In steps 5-6, the MTAS initiates a new session acting as a Back-to-Back User Agent (B2BUA) towards the announcement service owned by the IMS service provider with whom the MVNO has an agreement. Specifically, the MTAS sends an SIP INVITE message to the S-CSCF, where the SIP INVITE includes:
- an identifier of the MVNO (or an identifier of the virtual IMS operator); and/or
- an IMS network slice identifier that identifies the IMS network slice (e.g., the IMS network slice associated with the requested leased IMS service); and/or
- information that indicates the requested IMS service; and/or
- an enumerated list for sub-services if applicable (e.g., specific language for announcement, multi-language for conferencing, etc.). This list can be per service, for example conferencing has its own list, the MMTEL has its own list, etc.; and/or
- an identifier of an IMS network slice instance (e.g., an identifier of a particular instance of the IMS network slice associated with the requested leased IMS service).

Note that, in some embodiments, there may be a 1-to-1 mapping between IMS network slices and leased IMS services such that the information that identifies the IMS network slice also identifies the requested leased IMS service. The S-CSCF sends the SIP INVITE to the IBCF 104.

Step 7: In step 7, the incoming request to the IMS service provider arrives at the IBCF 104. The IBCF 104 decides whether to accept or reject the request. Specifically, the IBCF 104 makes this decision by performing any one or more of the following checks:
- The IBCF 104 authenticates the incoming request (e.g., determines that the request is actually from the MVNO or virtual IMS operator). This can be achieved by several means. For example, the operator identity must correspond to the incoming trunk Identifier (ID) where the request came from. A Transport Layer Security (TLS) can be also established between the operator and the IBCF 104. Other techniques can also be used to enable such an authentication to be performed.
- The IBCF 104 ensures that the MVNO or virtual IMS operator is entitled for the leased service.
- The IBCF 104 ensures the IMS network slice is valid and that the requested IMS service is valid, (e.g., conformant to the agreement between the IMS service provider and the MVNO or virtual IMS operator).
- The IBCF 104 validates that the SDP matches the requested leased service where applicable.

Steps 8-12: In steps 8-12, the announcement is played. More specifically, the IBCF 104 initiates the requested IMS service (the announcement) by sending an SIP invite to the appropriate media resource(s) in the IMS service provider domain (step 8), where the needed media resource(s) is engaged (step 9).

Step 13: In step 13, the MTAS stops the announcement.

Step 14: In step 14, the MTAS tears down the announcement session with the IMS service provider.

Step 15: In step 15, the IBCF 104 creates one or more appropriate CDRs to reflect that the IMS service provider provided the announcement for the MVNO or virtual IMS operator.

Step 16: In step 16, the MTAS establishes the session towards the target UEb, based on existing procedures.

Again, while the example of FIGS. 3A and 3B uses IMS network slice(s) to identify the requested IMS service(s), as discussed above, the present disclosure is not limited thereto. In some other embodiments, the SIP message in steps 5, 6, and 8 may include information, other than IMS network slice information, that identifies the requested leased IMS service(s). This information may include, for example, a predefined identifier associated with the requested IMS service(s).

Figure 4:
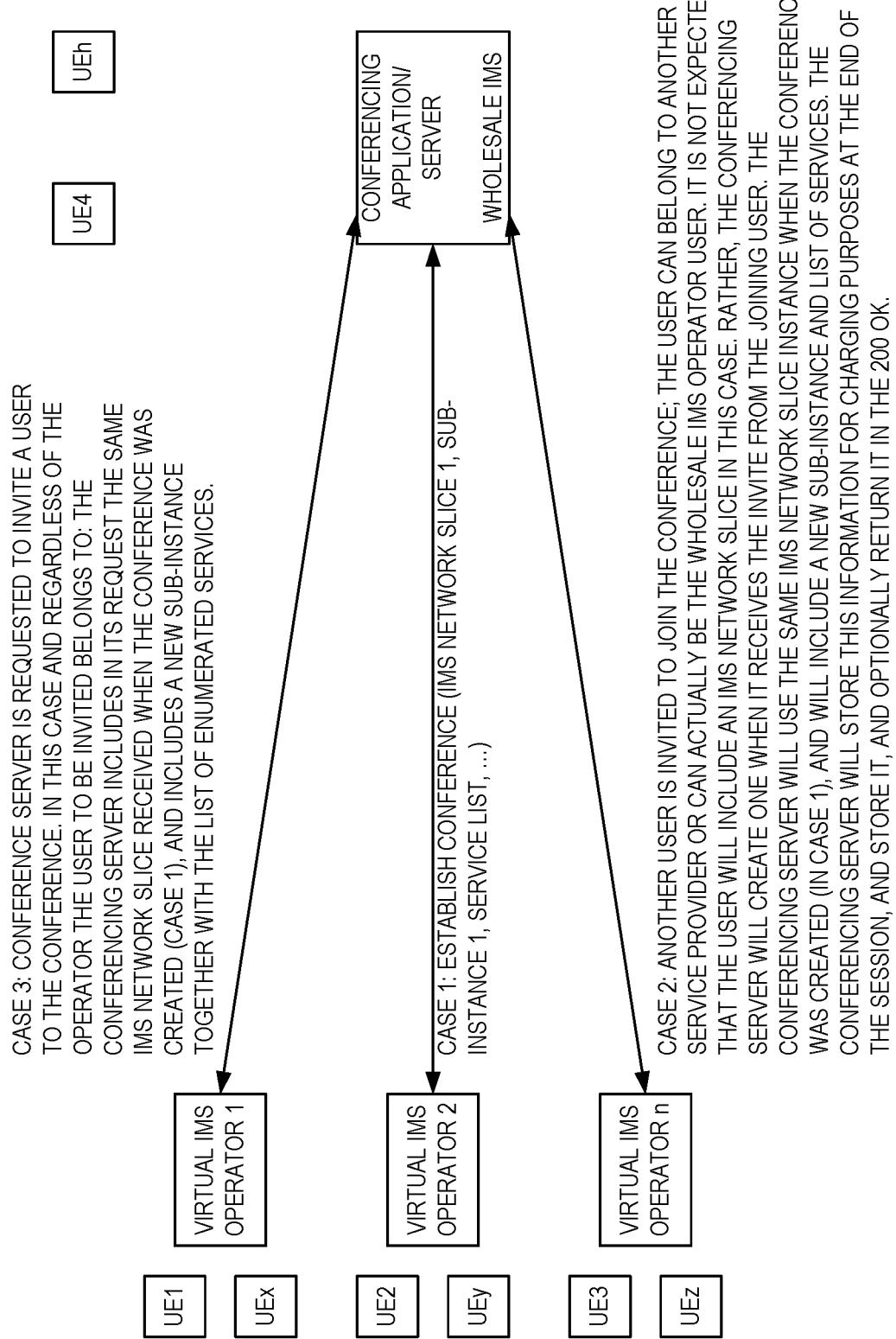
FIG. 4 illustrates another example embodiment of the present disclosure.

FIG. 4 illustrates another example. This example is about conferencing equipment. No detailed call flow is shown; however, FIG. 4 illustrates how the framework of FIG. 1 is used. FIG. 4 shows the three cases typically pertinent to a conferencing server, and has all the needed details to understand the scenario.

Another example service that may be leased from the IMS service provider is transcoding. For transcoding, the same principles apply. The MTAS acts as a third-party call control for the media resources, via the IBCF 104, and the terminating side if transcoding is performed in the terminating or originating network. No call flow is shown as the same principles as described above are applied. The distinction is that the network slice identifier and the requested service correspond to transcoding (see Technical Specification (TS) 23.218 annex B for examples).

Figure 5:
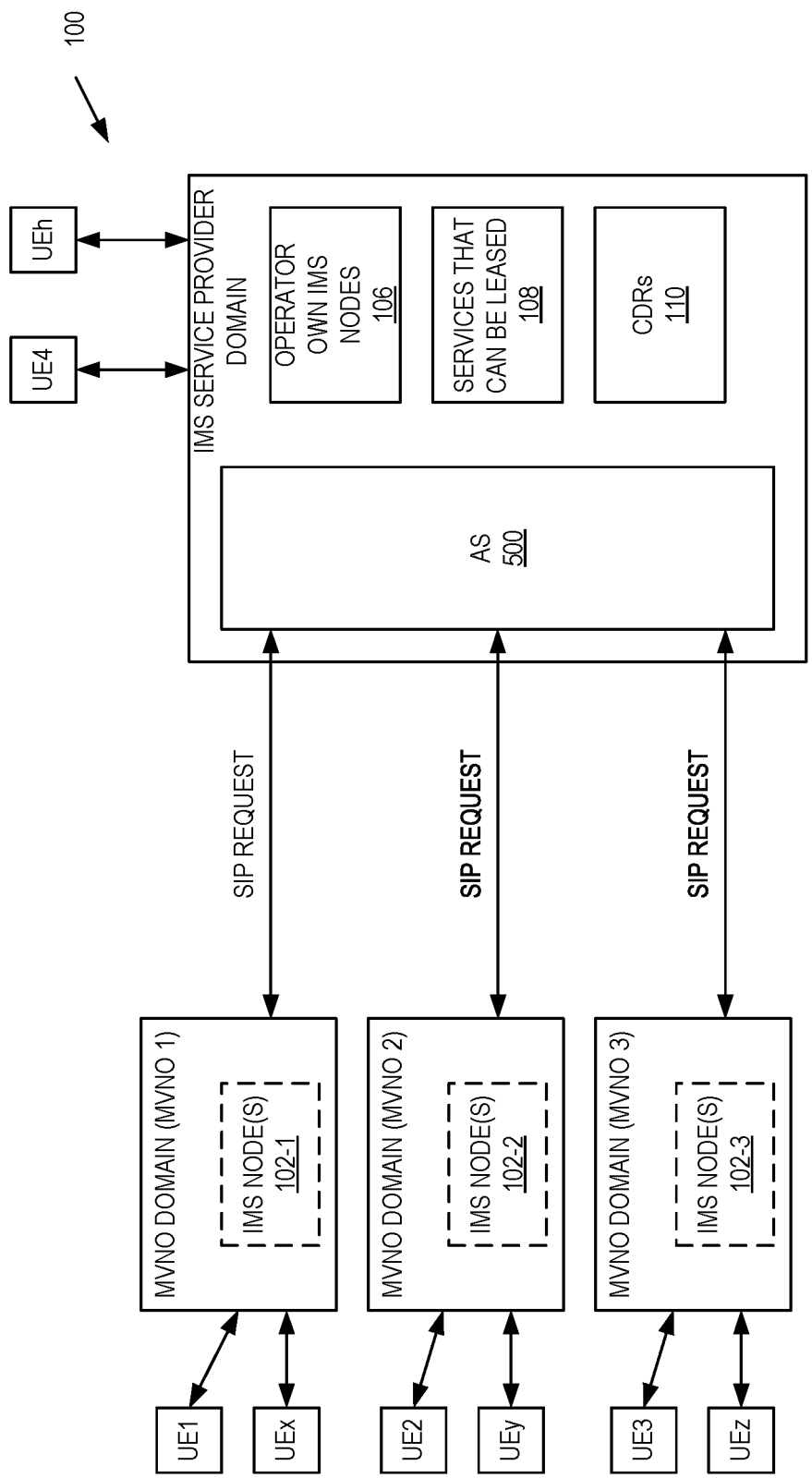
FIG. 5 illustrates an alternative embodiment in which Session Initiation Protocol (SIP) messages received in the domain of the IMS service provider from the MVNO domain do not include IMS network slice information or other types of information that identifies the requested leased IMS service(s)

In the embodiments described above, an SIP message including IMS network slice information (or some other type of information that identifies the requested leased IMS service(s)) is sent from the MVNO domain to the domain of the IMS service provider. FIG. 5 illustrates an alternative embodiment in which the SIP messages received in the domain of the IMS service provider from the MVNO domain do not include IMS network slice information or other types of information that identifies the requested leased IMS service(s). Instead, an AS 500 in the IMS network of the IMS service provider receives an SIP message from a particular MVNO and enforces a leasing agreement between that MVNO and the IMS service provider. Assuming that the SIP message needs a particular leased IMS service(s) and that the MVNO has leased the needed IMS service(s), the AS 500 initiates the needed IMS service(s) within the IMS service provider domain using, e.g., SIP message(s) that include IMS network slice information or other information that identify the IMS service(s) (i.e., the IMS service(s) used by the MVNO in accordance with the leasing agreement with the IMS service provider).

Figure 6:
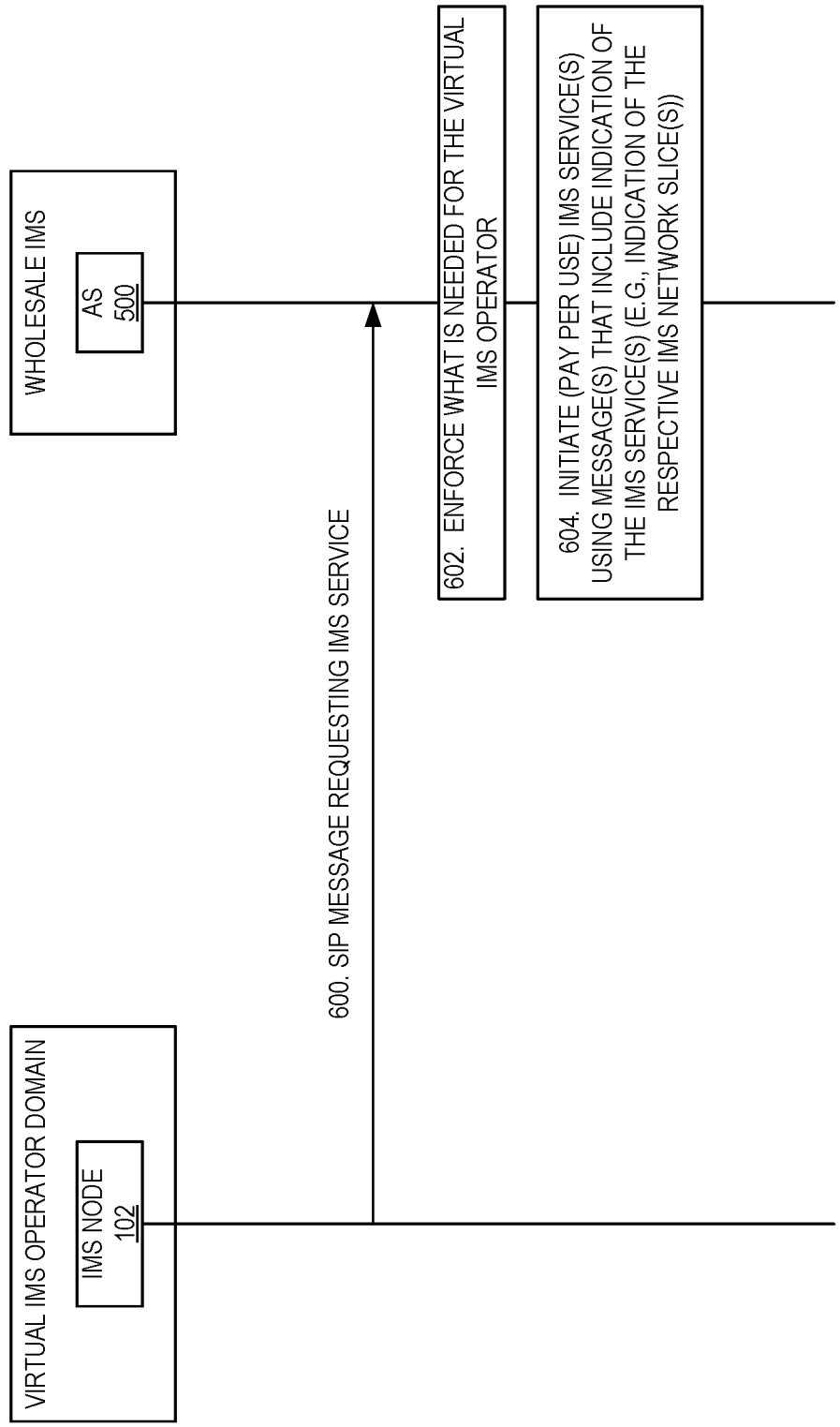
FIG. 6 illustrates the operation of an IMS node in an MVNO domain and an AS in an IMS service provider domain in accordance with one example of the alternative embodiment of FIG. 5.

The SIP message from the MVNO domain may be provided to the AS 500 from an IMS node 102 in the MVNO domain (also referred to as a virtual IMS operator domain in this context), as illustrated in FIG. 6. Alternatively, the SIP message from the MVNO domain may be provided to the AS 500 from, e.g., a UE that is subscribed to the MVNO and/or the IMS network of the IMS service provider, as illustrated in FIG. 7.

Looking first at FIG. 6, the IMS node 102 in the virtual IMS operator domain sends an SIP message to the AS 500 in the IMS service provider domain (step 600). Unlike the SIP message in the embodiment of, e.g., FIG. 2, the SIP message here does not include IMS network slice information or other information that identifies a requested leased IMS service(s). Upon receiving the SIP message, the AS 500 enforces what is needed for the virtual IMS network operator (step 602). More specifically, the AS 500 identifies the MVNO (e.g., in any desired manner such as, e.g., the Identity of the originating subscriber, or any other manner). The AS 500 then determines whether any pay-per-use IMS services are needed. If so, the AS 500 initiates the needed IMS service(s) using message(s) that include an indication of the IMS service(s) (e.g., IMS network slice information for the corresponding leased IMS network slice(s) or other type of information that indicates the needed IMS service(s)) (step 604).

Figure 7:
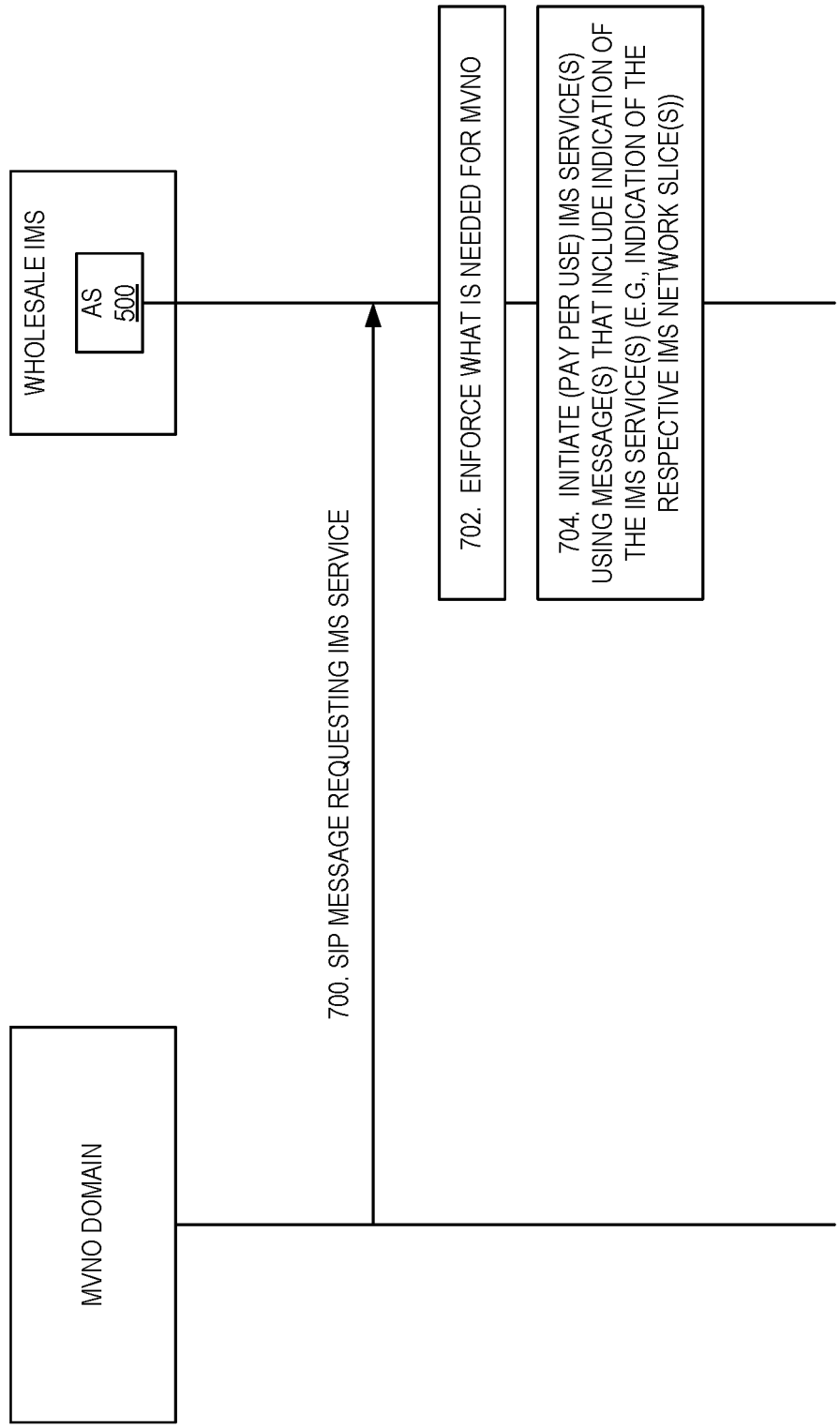
FIG. 7 illustrates the operation of an MVNO domain and an AS in an IMS service provider domain in accordance with another example of the alternative embodiment of FIG. 5.

Conversely, in the embodiment of FIG. 7, the AS 500 in the IMS service provider domain receives an SIP message from the MVNO domain of a particular MVNO (step 700). This SIP message may be provided by, e.g., a UE that has a subscription to the MVNO. Upon receiving the SIP message, the AS 500 enforces what is needed for the virtual IMS network operator (step 702). More specifically, the AS 500 determines whether any leased IMS service(s) is needed for processing of the SIP message and, if so, determines whether the virtual IMS operator has access to the needed IMS service(s) via an appropriate leasing agreement with the IMS service provider. If so, the AS 500 initiates the needed IMS service(s) using a message(s) that includes an indication of the leased IMS service(s) (e.g., IMS network slice information for the corresponding IMS network slice(s) or other type of information that indicates the needed IMS service(s)) (step 704).

Figure 8A:
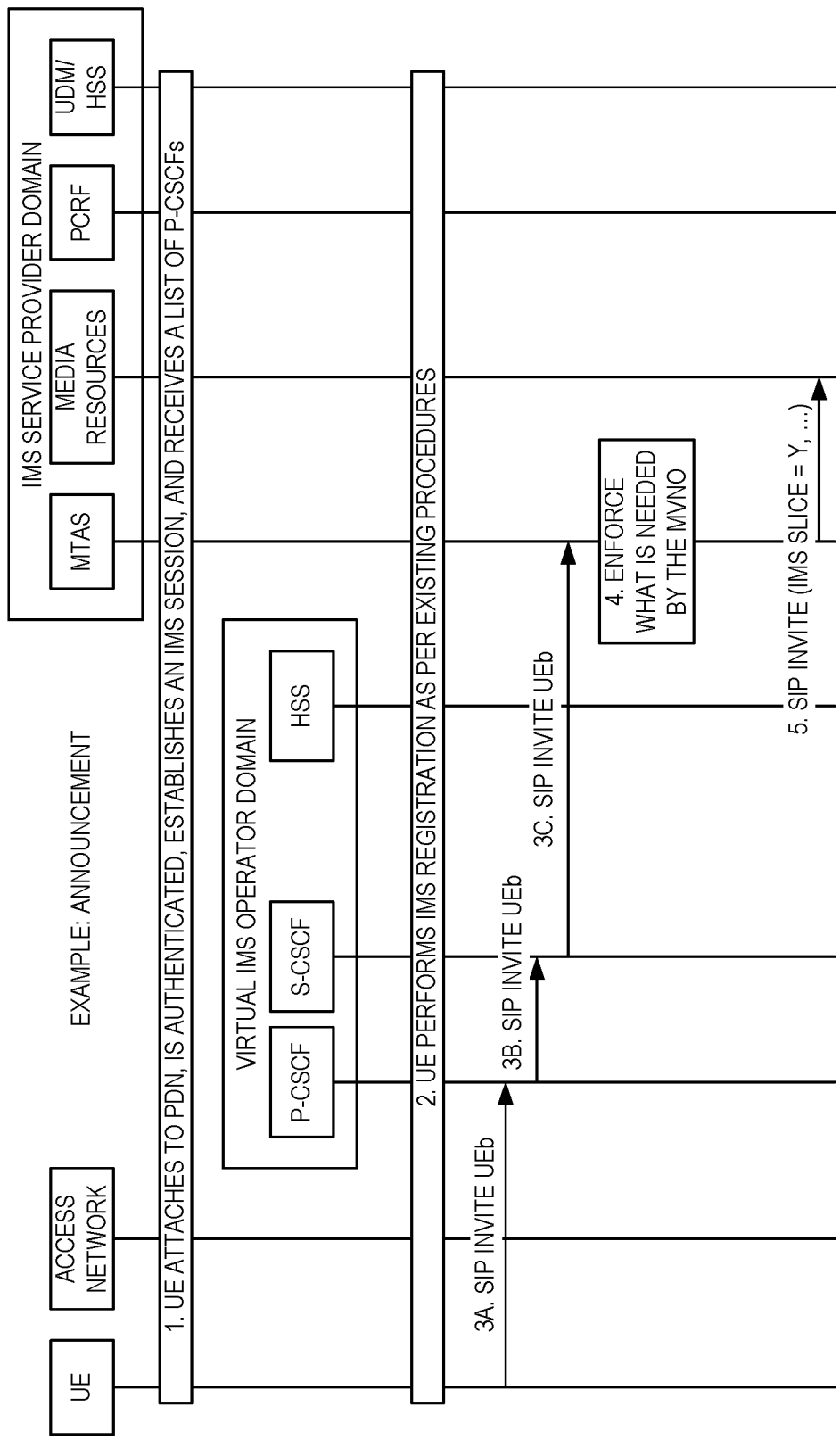
FIGS. 8A and 8B illustrate a specific example of the alternative embodiment of FIG. 5 in which the MVNO is in the IMS service provider domain and the MVNO leases media announcement services from the IMS service provider (e.g., another IMS operator)
Figure 8B:
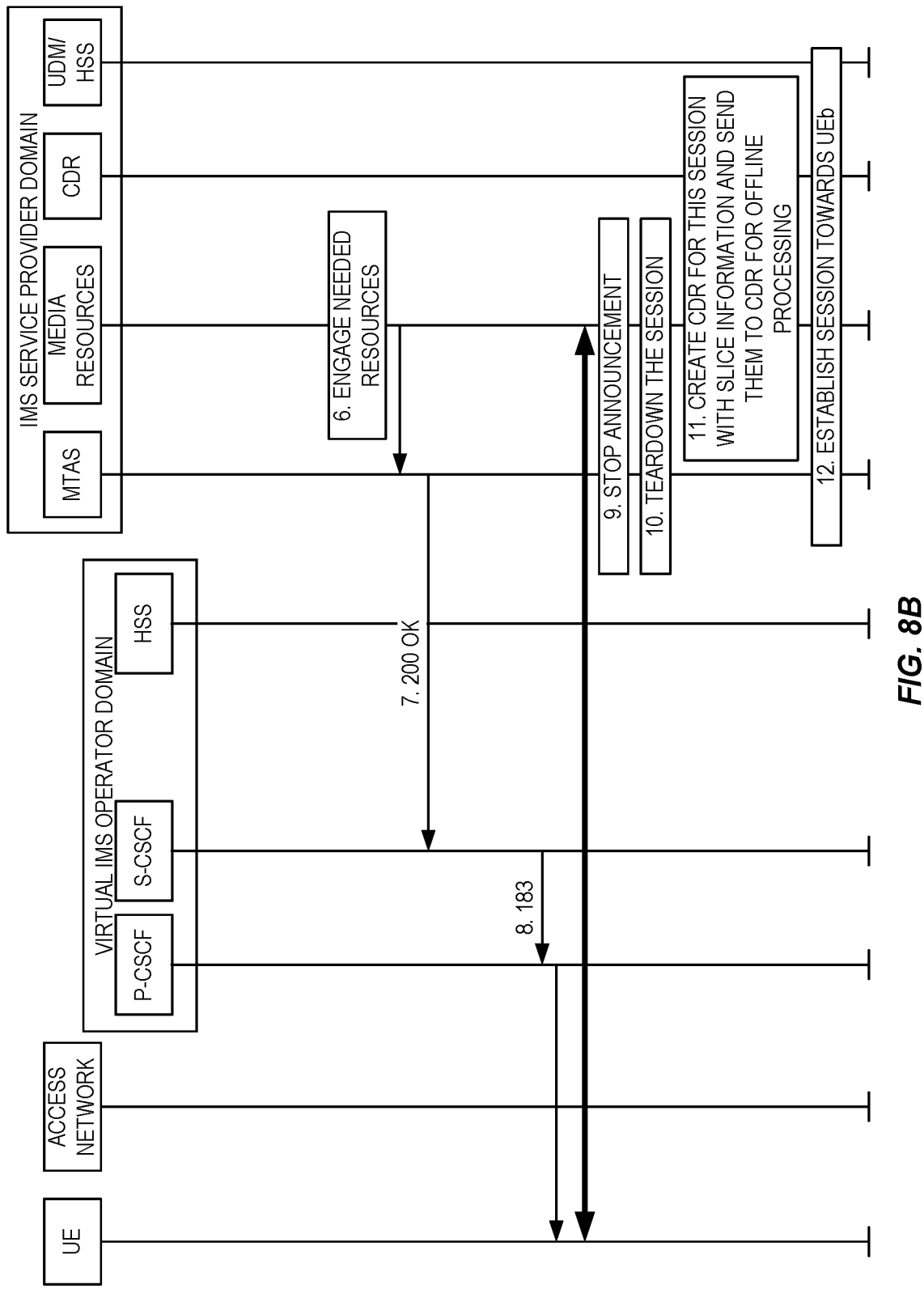

FIGS. 8A and 8B illustrate a specific example in which the MVNO does not own the MTAS and the MVNO leases media announcement services from the IMS service provider (e.g., another IMS operator). The steps in FIGS. 8A and 8B are:

Step 1: In step 1, a UE attaches to an access network and establishes a PDN connection to the IMS, e.g., in the conventional manner.

Step 2: In step 2, the UE establishes an IMS registration, e.g., in the conventional manner based on existing procedures. In this example, the MVNO includes its own HSS. In other words, the IMS node(s) 102 of this particular MVNO includes an HSS. In addition, as illustrated in FIGS. 8A and 8B, the IMS node(s) 102 of this particular MVNO includes a P-CSCF and an S-CSCF.

Steps 3A-3C: In steps 3A-3B, the UE (now referred to as UEa) initiates a session towards another UE, referred to as UEb. The session arrives at the MTAS in step 3C.

Step 4: In step 4, the MTAS enforces what is needed by the MVNO. More specifically, the MTAS identifies the MVNO (e.g., in any desired manner such as, the identity of the originating subscriber, or any other manner). The MTAS then determines whether any pay-per-use IMS services are needed. In this example, an announcement to UEa is needed before delivering the session to UEb, and the MVNO has an appropriate leasing agreement with the IMS service provider.

Steps 5-8: In steps 5-8, the announcement is played. More specifically, the MTAS initiates the requested IMS service (the announcement) by sending an SIP INVITE to the appropriate media resource(s) in the IMS service provider domain (step 5), where the needed media resource(s) is engaged (step 6). The SIP INVITE includes:

an identifier of the MVNO (or an identifier of the virtual IMS operator); and/or an IMS network slice identifier that identifies the IMS network slice (e.g., the IMS network slice associated with the requested leased IMS service); and/or information that indicates the requested IMS service; and/or an enumerated list for sub-services if applicable (e.g., specific language for announcement, multi-language for conferencing, etc.). This list can be per service, for example conferencing has its own list, MMTEL has its own list, etc.; and/or an identifier of an IMS network slice instance (e.g., an identifier of a particular instance of the IMS network slice associated with the requested leased IMS service).

Note that, in some embodiments, there may be a 1-to-1 mapping between IMS network slices and leased IMS services such that the information that identifies the IMS network slice also identifies the requested leased IMS service. The S-CSCF sends the SIP INVITE to the IBCF 104.

Step 9: In step 9, the MTAS stops the announcement.

Step 10: In step 10, the MTAS tears down the announcement.

Step 11: In step 11, the MTAS creates one or more appropriate CDRs to reflect that the IMS service provider provided the announcement for the MVNO.

Step 12: In step 12, the MTAS establishes the session towards the target UEb, based on existing procedures.

Network slicing utilizes virtualization technology (e.g., Software Defined Networking (SDN) and Network Function Virtualization (NFV)) to allow multiple virtual (i.e., logical) networks to be created on top of a common shared physical infrastructure. These virtual networks are referred to as network slices. The network slices can then be customized to meet needs of different use cases. In this regard, the IMS of the IMS service provider implemented in the IMS service provider domain includes multiple IMS network slices that are implemented on the same physical infrastructure. In this regard, while not illustrated in FIG. 1, the IMS service provider domain includes a number of IMS physical infrastructure nodes.

Figure 9:
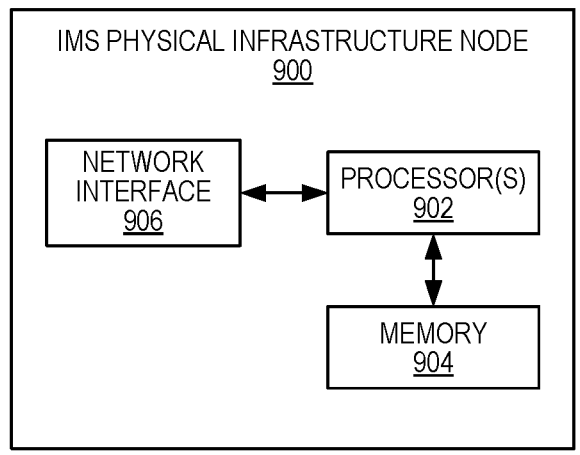
FIG. 9 is a schematic block diagram of an IMS physical infrastructure node that implements an IMS entity (e.g., an IMS node, the IBCF, or some other IMS entity) in accordance with some embodiments of the present disclosure.

FIG. 9 is a schematic block diagram of an IMS physical infrastructure node 900. The IMS network slices are logical or virtual networks that are implemented using virtualization technology on a number of IMS physical infrastructure nodes such as the IMS physical infrastructure node 900. In this regard, the IMS nodes 106 in the IMS service provider domain may be implemented as virtual nodes operating one or more IMS physical infrastructure nodes 900. Note, however, that some of the IMS nodes 106 may alternatively be implemented as physical nodes (i.e., as physical infrastructure nodes). Likewise, the IBCF 104 may be implemented as a physical infrastructure node 900 or implemented as a virtual node that operates on one or more physical infrastructure nodes 900. In the same manner, the IMS nodes 102 may be virtual nodes operating on IMS physical infrastructure nodes or IMS physical infrastructure nodes 900.

In this regard, as illustrated in FIG. 9, the IMS physical infrastructure node 900 includes one or more processors 902 (e.g., Central Processing Units (CPUs), Application Specific Integrated Circuits (ASICs), Field Programmable Gate Arrays (FPGAs), and/or the like), memory 904, and a network interface(s) 906. In some embodiments, using virtualization, the IMS nodes 102 or 106 and/or the IBCF 104 are implemented as virtual nodes that utilize physical resources (e.g., the processor(s) 902, the memory 904, and the network interface(s) 906) of IMS physical infrastructure nodes 900.

In some embodiments, a computer program including instructions which, when executed by at least one processor, causes the at least one processor to carry out the functionality of an IMS node according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
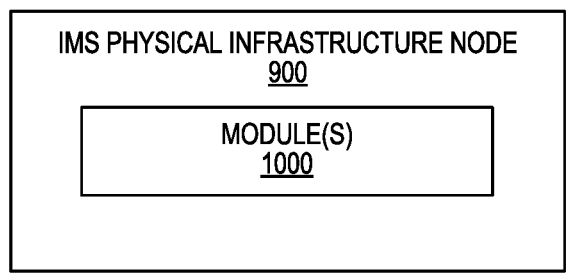
FIG. 10 is a schematic block diagram of an IMS physical infrastructure node that implements an IMS entity (e.g., an IMS node, the IBCF, or some other IMS entity) in accordance with some other embodiments of the present disclosure.

FIG. 10 is a schematic block diagram of the IMS physical infrastructure node 900 according to some other embodiments of the present disclosure. The IMS physical infrastructure node 900 includes one or more modules 1000, each of which is implemented in software. The module(s) 1000 provide the functionality of one or more of the IMS nodes described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by an Interconnect Border Control Function, IBCF, in an Internet Protocol, IP, Multimedia Subsystem, IMS, network of an IMS service provider to provide IMS services to a virtual IMS network operator, comprising:
  receiving, from an IMS node in a virtual IMS network domain of a virtual IMS network operator, a Session Initiation Protocol, SIP, message that serves as a request for a leased IMS service, the SIP message comprising:
    information that identifies the leased IMS service; and/or
    information that identifies an IMS network slice (e.g., an IMS network slice associated with the leased IMS service); and/or
    information that identifies the virtual IMS network operator; and/or
    information that identifies one or more sub-services requested for the leased IMS service; and/or
    information that identifies an IMS network slice instance (e.g., an instance of an IMS network slice associated with the leased IMS service); and
  making a decision as to whether to accept the request for the leased IMS service or reject the request for the leased IMS service based on the information comprised in the SIP message.

Embodiment 2: The method of embodiment 1 wherein: the decision is to accept the request for the leased IMS service; and the method further comprises, upon making the decision to accept the request for the leased IMS service, initiating the requested IMS service using one or more IMS nodes in the IMS network.

Embodiment 3: The method of embodiment 2 further comprising creating one or more charging data records that reflect that the requested leased IMS service was provided for the virtual IMS network operator.

Embodiment 4: The method of embodiment 1 wherein: the decision is to reject the request for the leased IMS service; and the method further comprises, upon making the decision to reject the request for the leased IMS service, sending a message to the IMS node in the virtual IMS network domain that indicates that the request for the requested leased IMS service is rejected.

Embodiment 5: The method of any one of embodiments 1 to 4 wherein making the decision as to whether to accept the request for the leased IMS service or reject the request for the leased IMS service comprises:
  authenticating that the request belongs to the virtual IMS network operator; and/or
  ensuring that the virtual IMS network operator is entitled for the leased IMS service; and/or
  validating the IMS network slice and the leased IMS service (e.g., validating that the leased IMS service is one that is leased by the virtual IMS network operator); and/or
  validating that a Session Description Protocol, SDP, matches the requested IMS service.

Embodiment 6: The method of any one of embodiments 1 to 5 further comprising providing at least a portion of the information comprised the SIP message to another IMS node in the IMS network of the IMS service provider.

Embodiment 7: The method of any one of embodiments 1 to 6 wherein the leased IMS service is a media related function (e.g., playing an announcement).

Embodiment 8: The method of any one of embodiments 1 to 6 wherein the leased IMS service is transcoding.

Embodiment 9: The method of any one of embodiments 1 to 6 wherein the leased IMS service is an IMS service related to a conference call.

Embodiment 10: An Interconnect Border Control Function, IBCF, for an Internet Protocol, IP, Multimedia Subsystem, IMS, network for providing IMS services to a virtual IMS network operator, the IBCF adapted to perform the method of any one of embodiments 1 to 9.

Embodiment 11: An Interconnect Border Control Function, IBCF, for an Internet Protocol, IP, Multimedia Subsystem, IMS, network for providing leased IMS services to a virtual IMS network operator, the IBCF comprising an interface and processing circuitry that causes the IBCF to perform the method of any one of embodiments 1 to 9.

Embodiment 12: A method performed by an Internet Protocol, IP, Multimedia Subsystem, IMS, node in a virtual IMS network domain of a virtual IMS network operator to request a leased IMS service from an IMS network, comprising:
 sending, to an Interconnect Border Control Function, IBCF, in the IMS network, a Session Initiation Protocol, SIP, message that serves as a request for a leased IMS service, the SIP message comprising:
 information that identifies the leased IMS service; and/or
 information that identifies an IMS network slice (e.g., an IMS network slice associated with the leased IMS service); and/or
 information that identifies the virtual IMS network operator; and/or
 information that identifies one or more sub-services requested for the leased IMS service; and/or
 information that identifies an IMS network slice instance (e.g., an instance of an IMS network slice associated with the leased IMS service).

Embodiment 13: The method of embodiment 12 wherein the leased IMS service is a media related function (e.g., playing an announcement).

Embodiment 14: The method of embodiment 12 wherein the leased IMS service is transcoding.

Embodiment 15: The method of embodiment 12 wherein the leased IMS service is an IMS service related to a conference call.

Embodiment 16: An Internet Protocol, IP, Multimedia Subsystem, IMS, node in a virtual IMS network domain of a virtual IMS network operator to request a leased MS service from an IMS network, the IMS node adapted to perform the method of any one of embodiments 12 to 15.

Embodiment 17: An Internet Protocol, IP, Multimedia Subsystem, IMS, node in a virtual IMS network domain of a virtual IMS network operator to request a leased IMS service from an IMS network, the IMS node comprising an interface and processing circuitry that causes the IMS node to perform the method of any one of embodiments 12 to 15.

Embodiment 18: A method performed by an Application Server, AS, in an Internet Protocol, IP, Multimedia Subsystem, IMS, network of an IMS service provider to provide leased IMS services to a virtual network operator, comprising:
 receiving, from a virtual network operator domain of the virtual network operator, a Session Initiation Protocol, SIP, message;
 upon receiving the SIP message, determining that a leased IMS service is needed to process the SIP message; and
 initiating the leased IMS service in the IMS network of the IMS service provider by sending a second SIP message to another node in the IMS network of the IMS service provider, the second SIP message comprising:
 information that identifies the leased IMS service; and/or
 information that identifies an IMS network slice (e.g., an IMS network slice associated with the leased IMS service); and/or
 information that identifies the virtual network operator; and/or
 information that identifies one or more sub-services desired for the leased IMS service; and/or
 information that identifies an IMS network slice instance (e.g., an instance of an IMS network slice associated with the leased IMS service).

Embodiment 19: The method of embodiment 18 wherein one or more charging data records are created that reflect that the leased IMS service was provided for the virtual network operator (e.g., based on the information comprised in the second SIP message).

Embodiment 20: The method of embodiment 18 or 19 wherein the leased IMS service is a media related function (e.g., playing an announcement).

Embodiment 21: The method of embodiment 18 or 19 wherein the leased IMS service is transcoding.

Embodiment 22: The method of embodiment 18 or 19 wherein the leased IMS service is an IMS service related to a conference call.

Embodiment 23: An Application Server, AS, in an Internet Protocol, IP, Multimedia Subsystem, IMS, network of an IMS service provider, the AS adapted to perform the method of any one of embodiments 18 to 22.

Embodiment 24: An Application Server, AS, in an Internet Protocol, IP, Multimedia Subsystem, IMS, network of an IMS service provider, the AS comprising an interface and processing circuitry that causes the AS to perform the method of any one of embodiments 18 to 22.

At least some of the following abbreviations may be used in this disclosure. If there is an inconsistency between abbreviations, preference should be given to how it is used above. If listed multiple times below, the first listing should be preferred over any subsequent listing(s).

AS Application Server
 ASIC Application Specific Integrated Circuit
 B2BUA Back-to-Back User Agent
 CDR Charging Data Record
 CPU Central Processing Unit
 DSP Digital Signal Processor
 FPGA Field Programmable Gate Array
 HSS Home Subscriber Server
 IBCF Interconnect Border Control Function
 ID Identifier
 IMS Internet Protocol Multimedia Subsystem
 IP Internet Protocol
 MMTEL Multimedia Telephony
 MTAS Multimedia Telephony Application Server
 MVNO Mobile Virtual Network Operator
 NFV Network Function Virtualization
 P-CSCF Proxy Call Session Control Function
 PDN Packet Data Network
 RAM Random Access Memory
 RAN Radio Access Network
 ROM Read Only Memory
 S-CSCF Serving Call Session Control Function
 SDN Software Defined Networking
 SDP Session Description Protocol SIP Session Initiation Protocol
TLS Transport Layer Security
TS Technical Specification
UE User Equipment
VoLTE Voice over Long Term Evolution Those skilled in the art will recognize improvements and modifications to the embodiments of the present disclosure. All such improvements and modifications are considered within the scope of the concepts disclosed herein.

What is claimed is:

1. A method performed by an Interconnect Border Control Function (IBCF) in an Internet Protocol (IP) Multimedia Subsystem (IMS) network of an IMS service provider to provide IMS services to a virtual IMS network operator, comprising:
   receiving, from an IMS node in a virtual IMS network domain of the virtual IMS network operator, a Session Initiation Protocol (SIP) message that serves as a request for a leased IMS service, wherein the IMS service provider leases the IMS services that are owned by the IMS service provider to the virtual IMS network operator, and wherein the leasing of the IMS services owned by the IMS service provider to the virtual IMS network operator is based on pay-per-use, the SIP message comprising:
      information that identifies one or more sub-services requested for the leased IMS service, wherein the one or more sub-services corresponds to at least one of a specific language for announcement or a multi-language for conferencing; and one of information that identifies the leased IMS service;
      information that identifies an IMS network slice;
      information that identifies the virtual IMS network operator; or
      information that identifies an IMS network slice instance; and
   making a decision as to whether to accept the request for the leased IMS service or reject the request for the leased IMS service based on the information comprised in the SIP message.

2. The method of claim 1, wherein the SIP message further comprises the information that identifies the IMS network slice, the IMS network slice is associated with the leased IMS service.

3. The method of claim 1, wherein the SIP message further comprises the information that identifies the IMS network slice instance, the IMS network slice instance is an instance of the IMS network slice associated with the leased IMS service.

4. The method of claim 1, wherein:
   the decision is to accept the request for the leased IMS service; and
   the method further comprises, upon making the decision to accept the request for the leased IMS service, initiating the requested leased IMS service using one or more IMS nodes in the IMS network.

5. The method of claim 4, further comprising creating one or more charging data records, wherein the one or more charging data records reflects that the requested leased IMS service was provided for the virtual IMS network operator.

6. The method of claim 1, wherein:
   the decision is to reject the request for the leased IMS service,
   the method further comprises, upon making the decision to reject the request for the leased IMS service, sending a message to the IMS node in the virtual IMS network domain, and
   the message indicates that the request for the requested leased IMS service is rejected.

7. The method of claim 1, wherein making the decision as to whether to accept the request for the leased IMS service or reject the request for the leased IMS service comprises at least one of:
   authenticating that the request belongs to the virtual IMS network operator;
   ensuring that the virtual IMS network operator is entitled to the leased IMS service;
   validating the IMS network slice and the leased IMS service; or
   validating that a Session Description Protocol (SDP) matches the requested IMS service.

8. The method of claim 1, further comprising providing at least a portion of the information comprising the SIP message to another IMS node in the IMS network of the IMS service provider.

9. The method of claim 1, wherein the leased IMS service is a media related function.

10. The method of claim 1, wherein the leased IMS service is making the announcement.

11. The method of claim 1, wherein the leased IMS service is transcoding.

12. The method of claim 1, wherein the leased IMS service is an IMS service related to a conference call.

13. A method performed by an Internet Protocol (IP) Multimedia Subsystem (IMS) node in a virtual IMS network domain of a virtual IMS network operator to request a leased IMS service from an IMS network, on behalf of a User Equipment (UE), the method comprising:
   sending, to an Interconnect Border Control Function (IBCF) in the IMS network, a Session Initiation Protocol (SIP) message that serves as a request for the leased IMS service, wherein the IMS network leases the IMS services that are owned by the IMS network to the IMS node, and wherein the leasing of the IMS services owned by the IMS service provider to the virtual IMS network operator is based on pay-per-use, the SIP message comprising:
      information that identifies one or more sub-services requested for the leased IMS service, wherein the one or more sub-services corresponds to at least one of a specific language for announcement or a multi-language for conferencing; and one of information that identifies the leased IMS service;
      information that identifies an IMS network slice;
      information that identifies the virtual IMS network operator; or
      information that identifies an IMS network slice instance.

14. The method of claim 13, wherein the leased IMS service is a media related function.

15. The method of claim 13, wherein the leased IMS service is transcoding.

16. The method of claim 13, wherein the leased IMS service is making the announcement.

17. The method of claim 13, wherein the leased IMS service is an IMS service related to a conference call.

18. A method performed by an Application Server (AS) in an Internet Protocol (IP) Multimedia Subsystem (IMS) network of an IMS service provider to provide leased IMS services to a virtual network operator, comprising:
   receiving, from a virtual network operator domain of the virtual network operator, a Session Initiation Protocol (SIP) message;
   upon receiving the SIP message, determining that a leased IMS service is needed to process the SIP message, wherein the IMS service provider leases the IMS service that is owned by the IMS service provider to the virtual network operator, and wherein the leasing of the IMS services owned by the IMS service provider to the virtual IMS network operator is based on pay-per-use; and initiating the leased IMS service in the IMS network of the IMS service provider by sending a second SIP message to another node in the IMS network of the IMS service provider, the second SIP message comprising:
information that identifies one or more sub-services requested for the leased IMS service, wherein the one or more sub-services corresponds to at least one of a specific language for announcement or a multi-language for conferencing; and one of information that identifies the leased IMS service;
information that identifies an IMS network slice;
information that identifies the virtual network operator; or
information that identifies an IMS network slice instance.

19. The method of claim 18, wherein
one or more charging data records are created, and
the one or more charging data records reflects that the leased IMS service was provided for the virtual network operator.

20. The method of claim 18, wherein the leased IMS service is a media related function.

* * * * *